US011170017B2

(12) United States Patent
Dessau

(10) Patent No.: US 11,170,017 B2
(45) Date of Patent: Nov. 9, 2021

(54) METHOD OF FACILITATING QUERIES OF A TOPIC-BASED-SOURCE-SPECIFIC SEARCH SYSTEM USING ENTITY MENTION FILTERS AND SEARCH TOOLS

(71) Applicant: Robert Michael Dessau, New York, NY (US)

(72) Inventor: Robert Michael Dessau, New York, NY (US)

( * ) Notice: Subject to any disclaimer, the term of this patent is extended or adjusted under 35 U.S.C. 154(b) by 405 days.

(21) Appl. No.: 16/283,357

(22) Filed: Feb. 22, 2019

(65) Prior Publication Data

US 2020/0272621 A1    Aug. 27, 2020

(51) Int. Cl.
| | | |
|---|---|---|
| *G06F 17/00* | (2019.01) | |
| *G06F 7/00* | (2006.01) | |
| *G06F 16/248* | (2019.01) | |
| *G06F 16/22* | (2019.01) | |
| *G06F 16/245* | (2019.01) | |
| *G06F 9/451* | (2018.01) | |

(52) U.S. Cl.
CPC ............ *G06F 16/248* (2019.01); *G06F 16/22* (2019.01); *G06F 16/245* (2019.01); *G06F 9/451* (2018.02)

(58) Field of Classification Search
CPC ...... G06F 16/248; G06F 16/22; G06F 16/245; G06F 9/451
USPC .......................................................... 707/722
See application file for complete search history.

(56) References Cited

U.S. PATENT DOCUMENTS

| | | | |
|---|---|---|---|
| 6,460,029 B1 | 10/2002 | Fries | |
| 6,477,536 B1* | 11/2002 | Pasumansky | ....... G06F 16/2445 |
| 6,571,234 B1 | 5/2003 | Knight | |
| 6,581,068 B1* | 6/2003 | Bensoussan | ...... G06F 16/24539 |
| 6,594,654 B1 | 7/2003 | Salam | |
| 6,675,159 B1 | 1/2004 | Deirchow | |
| 6,678,694 B1 | 1/2004 | Zimmermann | |
| 6,751,606 B1 | 6/2004 | Fries | |

(Continued)

FOREIGN PATENT DOCUMENTS

WO    2014197663    12/2014

OTHER PUBLICATIONS

Dong, Ruihai, et al., "Harnessing the Experience Web to Support User-Generated Product Reviews", Case-Based Reasoning Research and Development, vol. 7466 of the series Lecture Notes in Computer Science 20th International Conference, ICCBR 2012, Lyon, France, Sep. 3-6, 2012, pp. 62-76.

(Continued)

*Primary Examiner* — Pavan Mamillapalli
(74) *Attorney, Agent, or Firm* — Sheppard Mullin Richter & Hampton LLP

(57) ABSTRACT

Approaches for facilitating queries of a topic-based-source-specific search system using entity mention filters and search tools relating to search strategies are disclosed. In certain implementations, an input relating to a query may be received. One or more predefined sources and information items may be determined based on the received input. In some implementations, the system may be configured to apply one or more user-selected entity mention filters to determine information items and sources that are associated with one or more predefined entities or their corresponding aliases. In some implementations, the system may be configured to retrieve information items with corresponding sources that relate to a predefined source set of a search tool.

15 Claims, 9 Drawing Sheets

(56) References Cited

U.S. PATENT DOCUMENTS

| | | | |
|---|---|---|---|
| 6,877,006 B1 * | 4/2005 | Vasudevan | G06F 16/283 |
| 6,892,196 B1 | 5/2005 | Hughes | |
| 8,577,847 B2 * | 11/2013 | Blazejewski | G06F 16/258 |
| | | | 707/661 |
| RE44,794 E | 3/2014 | Stephens, Jr. | |
| 8,799,207 B1 * | 8/2014 | Stolte | G06F 16/283 |
| | | | 707/602 |
| 8,990,352 B1 | 3/2015 | Kosslyn | |
| 8,996,629 B1 | 3/2015 | Datar | |
| 9,171,055 B1 * | 10/2015 | Stolte | G06F 16/283 |
| 9,183,269 B1 * | 11/2015 | Stolte | G06F 16/283 |
| 9,330,091 B1 * | 5/2016 | Stolte | G06F 16/00 |
| 9,405,822 B2 | 8/2016 | Dessau | |
| 9,922,101 B1 * | 3/2018 | Reiner | G06F 16/256 |
| 10,318,402 B2 * | 6/2019 | Oberle | G06F 11/3604 |
| 2002/0032677 A1 | 3/2002 | Morgenthaler | |
| 2002/0178394 A1 | 11/2002 | Bamberger | |
| 2002/0184091 A1 | 12/2002 | Pudar | |
| 2003/0200192 A1 | 10/2003 | Bell | |
| 2005/0010605 A1 | 1/2005 | Conrad | |
| 2005/0108200 A1 | 5/2005 | Meik | |
| 2005/0149496 A1 * | 7/2005 | Mukherjee | G06F 16/24575 |
| | | | 707/999.003 |
| 2006/0004814 A1 | 1/2006 | Lawrence | |
| 2006/0004866 A1 | 1/2006 | Lawrence | |
| 2006/0184566 A1 | 8/2006 | Lo | |
| 2006/0274767 A1 | 12/2006 | Dessau | |
| 2007/0244900 A1 | 10/2007 | Hopkins | |
| 2008/0094234 A1 | 4/2008 | Gologorsky | |
| 2008/0140621 A1 | 6/2008 | Martinez | |
| 2008/0189273 A1 | 8/2008 | Kraftsow | |
| 2008/0243825 A1 | 10/2008 | Staddon | |
| 2008/0244644 A1 | 10/2008 | McCausland | |
| 2008/0256023 A1 | 10/2008 | Nair | |
| 2008/0300935 A1 | 12/2008 | Musier | |
| 2008/0319947 A1 | 12/2008 | Latzina | |
| 2009/0030897 A1 | 1/2009 | Hatami-Hanza | |
| 2009/0094211 A1 | 4/2009 | Marvit | |
| 2009/0100039 A1 | 4/2009 | Chang | |
| 2009/0150832 A1 | 6/2009 | Keller | |
| 2009/0248661 A1 | 10/2009 | Bilenko | |
| 2009/0254572 A1 | 10/2009 | Redlich | |
| 2009/0254838 A1 | 10/2009 | Rao | |
| 2009/0276419 A1 | 11/2009 | Jones | |
| 2010/0070448 A1 | 3/2010 | Omoigui | |
| 2010/0076979 A1 | 3/2010 | Wang | |
| 2010/0082594 A1 | 4/2010 | Bhat | |
| 2010/0169304 A1 | 7/2010 | Hendricksen | |
| 2010/0185641 A1 | 7/2010 | Brazier | |
| 2010/0198802 A1 | 8/2010 | Kraftsow | |
| 2010/0250497 A1 | 9/2010 | Redlich | |
| 2011/0099133 A1 | 4/2011 | Chang | |
| 2011/0145269 A1 | 6/2011 | Kraftsow | |
| 2011/0161311 A1 | 6/2011 | Mishne | |
| 2011/0208822 A1 | 8/2011 | Rathod | |
| 2011/0276396 A1 | 11/2011 | Rathod | |
| 2011/0282752 A1 | 11/2011 | Manriquez | |
| 2012/0036109 A1 * | 2/2012 | Blazejewski | G06F 16/258 |
| | | | 707/667 |
| 2012/0076414 A1 | 3/2012 | Xu | |
| 2012/0110179 A1 | 5/2012 | Van Coppenolle | |
| 2012/0124149 A1 | 5/2012 | Gross | |
| 2012/0233253 A1 | 9/2012 | Ricci | |
| 2012/0290950 A1 | 11/2012 | Rapaport | |
| 2012/0311465 A1 | 12/2012 | Nealer | |
| 2012/0331420 A1 | 12/2012 | Meyer | |
| 2013/0031450 A1 | 1/2013 | Reese | |
| 2013/0159127 A1 | 6/2013 | Myslinski | |
| 2013/0159333 A1 | 6/2013 | Assam | |
| 2013/0232167 A1 | 9/2013 | Vidra | |
| 2014/0059452 A1 | 2/2014 | Kao | |
| 2014/0101542 A1 | 4/2014 | Albrecht | |
| 2014/0101544 A1 | 4/2014 | Albrecht | |
| 2014/0101606 A1 | 4/2014 | Albrecht | |
| 2014/0123178 A1 | 5/2014 | Burkitt | |
| 2014/0180826 A1 | 6/2014 | Boal | |
| 2014/0280739 A1 | 9/2014 | Ljubin | |
| 2014/0365467 A1 | 12/2014 | Dessau | |
| 2015/0026212 A1 | 1/2015 | Fink | |
| 2015/0309990 A1 | 10/2015 | Corville | |
| 2016/0342611 A1 | 11/2016 | Dessau | |
| 2016/0343144 A1 | 11/2016 | No | |
| 2017/0235848 A1 | 8/2017 | Van Dusen | |

OTHER PUBLICATIONS

Shokouhi, Milad, "Learning the Personalize Query Auto-Completion", Proceedings SIGIR '13 Proceedings of the 36th International ACM SIGIR Conference on Research and Development in Information Retrieval, Dublin, Ireland, Jul. 28-Aug. 1, 2013, pp. 103-112.

* cited by examiner

METHOD OF FACILITATING QUERIES OF A TOPIC-BASED-SOURCE-SPECIFIC SEARCH SYSTEM USING ENTITY MENTION FILTERS AND SEARCH TOOLS

FIELD OF THE INVENTION

The invention relates to a topic-based-source-specific search system, including, among other aspects, simultaneous presentation of search results, determination of search results relating to institutional entities, facilitating searching through the use of selectable search took or other features based on queries of a topic-based-source-specific search system.

BACKGROUND OF THE INVENTION

Numerous disparate sources of government information exist, including information relating to institutional entities. These sources include government websites, intergovernmental agency websites, news websites, and other sources. One problem with existing systems and methods for accessing this information is the need to expend resources to separately monitor and read individual information sources to find current information relating to or involving institutional entities. These and other drawbacks exist, creating inefficiencies in information sharing and reducing transparency between the public and institutional actors.

SUMMARY OF THE INVENTION

The invention addressing these and other drawbacks relates to methods, apparatuses, and/or systems for facilitating queries of a topic-based-source-specific search system using entity mention filters and search tools. In exemplary embodiments, a plurality of predefined sources of government information may be pre-selected for the topic based-source-specific search system. The predefined sources and information items may have information pertaining to or relating to various entities, including corporate entities, professional entities, or more. The predefined sources and information items of the predefined sources may be processed.

Metadata indicating various attributes of the predefined sources or the information items may be stored in association with the predefined sources or the information items, including, information pertaining to an association between the information items or sources and predefined entities, information pertaining to an association between the information items or sources and predefined entity aliases, information pertaining to an association between the information items or sources and one or more predefined search tools. The search system, user interfaces of the search system, or other components of the search system may be configured to provide: (i) the discovery of information items relating to various entities of various entity types; (ii) the discovery of information items that relate to a particular searching strategy or other; and (iii) other benefits.

A system for facilitating queries of a topic-based source-specific search system may comprise one or more servers (or other components) that include one or more processors configured to execute one or more computer program modules. The computer program modules may include a query input module, a suggestion module, a user interface module, an information retrieval module, an indexing module, a search tool module, an entity mention filter module, or other modules.

In certain implementations, the topic-based-search specific search system may be configured to collect information from predefined sources relating to a content topic prior to queries of the topic-based-search-specific search system. In some implementations, the content topic may correspond to government information or other type of information.

The computer-implemented method of facilitating queries of a topic-based-source-specific search system using mention filters may be implemented by a system that includes one or more processors executing one or more computer program modules. The system may provide, by a user interface module, a query input component on a display of a user interface, wherein the query input component is configured to receive input. In implementations, the system, through a query input module, receives an input relating to a query. An information retrieval module, may determine a subset of information items that relate to the received input and one or more sources associated with the determined subset of the information items. In implementations, the system may, by the user interface module, one or more representations of the sources associated with the subset of the information items in a first area on the display of the user interface simultaneously with the query input component.

In various implementations, the system may determine, by an entity mention filter module, one or more entity information items of the subset of information items based on an entity mention filter. In exemplary embodiments, an entity mention filter may relate to a predefined entity having a predefined entity type and one or more predefined aliases associated with the entity. In embodiments, the system may be configured to provide, by the user interface module, one or more representations of information items and sources associated with an entity in a first area on the display of a user interface simultaneously with the query input component.

In various embodiments, the system may apply, by an entity mention filter module, one or more entity mention filters on information items to discover information items associated with various entities. In certain implementations, a predefined entity type may be one or more of an accounting firm, an association, a corporation, a government office, a law firm, a non-profit organization, a think tank, or a union.

In various embodiments, the system may determine, by a search tool module, a search tool source set associated with a search strategy, wherein the search tool source set includes at least one source associated with the search tool. A search tool source set may involve sources corresponding to a due diligence, lawmaking, rulemaking, compliance, or "trending" search strategy. In various embodiments, the system may provide, by the user interface module, representations of options to select a search tool in a search tool area on the display of a user interface, wherein the search tool area is provided on the display of a user interface simultaneously with the first area and the query input component. In various embodiments, the system may determine, by the search tool module, information items associated with a user selected search tool source set and may provide, by the user interface module, representations of information items associated with the search tool source set in the first area on the display of the user interface, wherein the first area is provided on the display of the user interface simultaneously with the query input component and the representations of options to select a search tool.

In certain implementations, the system may provide, by the user interface module, representations of options to select or unselect one or more of a plurality of predefined entity types in a second area on the display of the user interface, wherein the second area is provided on the display of the user interface simultaneously with the first area and the query input component. In certain implementations, the system may receive, by the user interface module, user input corresponding to a selection of one or more predefined entity types. In some implementations, the system may provide, by the user interface module, one or more representations of predefined entities corresponding to selected predefined entity and representations of options to select or unselect one or more of the predefined entities in the second area on the display of the user interface. In some embodiments, the system may provide, by the user interface module, an alternative representation adjacent to the representations of the predefined entities in the second area on the display of the user interface if the entity mention filter module indicates that there are no information items associated with the predefined entities. In some limitations, the alternative representation may be represented as a shaded and closed object.

In certain embodiments, the system may store, by an indexing module, metadata in association with the information items, wherein the metadata indicate one or more of one or more predefined entities relating to the information items, one or more predefined entity aliases relating to the information items; and one or more sources relating to the information items. In various embodiments, the system may determine information items associated with one or more predefined entities by analyzing the metadata of information items.

In various embodiments, the system may determine, by a search tool module, a search tool source set associated with a search tool, wherein the search tool source set includes at least one source associated with a search strategy. In certain implementations, the system may be configured to provide, by the user interface module, representations of options to select a search tool in a search tool area on the display of the user interface. In certain implementations, the system may be configured to determine, by the search tool module, one or more information items having an association with the search tool source set. In various embodiments, a search tool source set may comprises to sources related to due diligence, lawmaking, rulemaking, compliance, or "trending" search strategies. In various embodiments, the system may store, by an indexing module, metadata in association with the information items, wherein the metadata may indicate a search tool source set associated with the information item. In certain implementation, determining, by the search tool module, one or more information items of the determined having an association with a search tool source set comprises analyzing the metadata information associated with the information item.

The figures are not exhaustive and do not limit the present disclosure to the precise form disclosed.

DETAILED DESCRIPTION

In the following description, for the purposes of explanation, numerous specific details are set forth in order to provide a thorough understanding of the implementations of the disclosure. It will be appreciated, however, by one skilled in the art that the implementations of the disclosure may be practiced without these specific details or with an equivalent arrangement. In other instances, well-known structures and devices are shown in block diagram form in order to avoid unnecessarily obscuring the implementations of the disclosure. It should be noted that features (e.g., components, operations, or other features) described herein may be implemented separately or in combination with one another.

Figure 1:
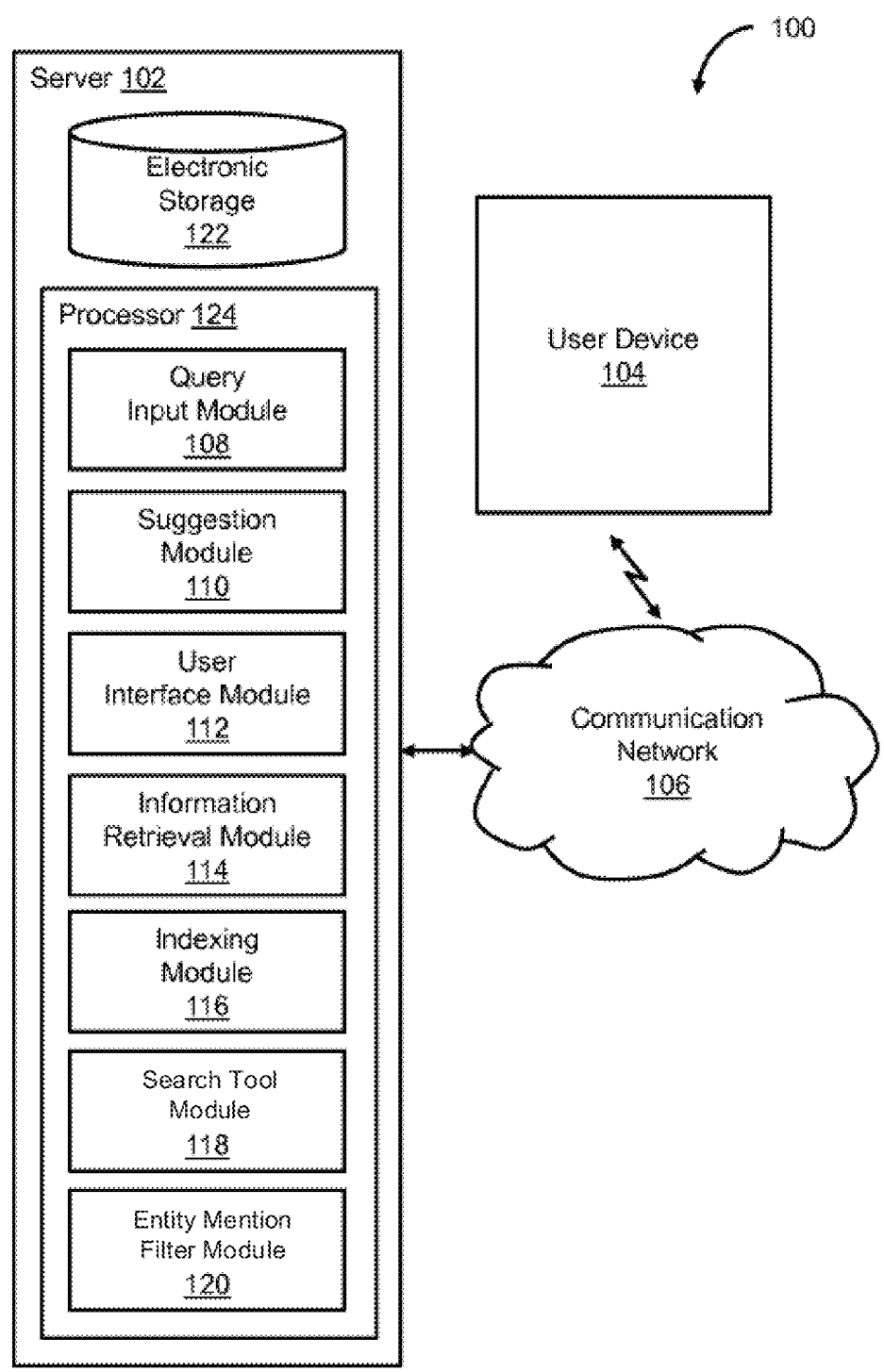
FIG. 1 illustrates a diagram of a system for facilitating queries of a topic-based-source-specific search system using entity mention filters and search tools, in accordance with one or more implementations.

FIG. 1 illustrates a diagram of system 100 for facilitating queries of a topic-based-source-specific search system using mention filters and search tools, in accordance with one or more implementations. System 100 may comprise the topic-based-source-specific search system. The topic-based-source-specific search system may include one or more servers 102. Server 102 (or servers 102) may be configured to communicate with one or more user devices 104 according to a client/server architecture (e.g., over communication network 106 or via other communication medium). Users may access system 100 via one or more user devices 104.

Server 102 may be configured to execute one or more computer program modules to facilitate queries of a topic-based-source-specific search system using mention filters. The computer program modules may include a query input module 108, a suggestion module 110, a user interface module 112, an information retrieval module 114, an indexing module 116, a search tool module 118, a120, or other modules.

In certain implementations, the topic-based-search-specific search system may be configured to collect information from predefined sources relating to a content topic prior to queries of the topic-based-search-specific search system. In some implementations, the content topic may correspond to government information or other type of information. The search system may, for example, determine the predefined sources and collect information from the predefined sources using techniques as described in U.S. patent application Ser. No. 11/430,145, entitled "System and Method for Collecting, Processing, and Presenting Selected Information From Selected Sources via a Single Website," filed May 9, 2006, which is hereby incorporated by reference on its entirety. Further, the search system may collect and store information, including in metadata form, on information items relating to an association between the information items and one or more predefined entities; or information associating the predefined sources corresponding to the information items with a set of sources related to a search tool source set.

Query input module 108 may be configured to receive an input relating to a query. In one scenario, the received input may correspond to a portion of a query that a user has not yet submitted or otherwise completed. The received input may, for instance, represent at least a portion of a query that the user may submit. In another scenario, the received input may correspond to a complete query. In certain implementations, the topic-based-search-specific search system may be configured to provide one or more information items and corresponding sources based on user input as described in U.S. patent application Ser. No. 13/911,565, entitled "Queries of a Topic-Based-Source Specific Search System," filed Jun. 6, 2013, which is hereby incorporated by reference on its entirety.

In certain implementations, the information items of the predefined sources may relate to press releases, speeches, opinions, statements, legislations, or other government information. Formats of the information items may correspond to one or more of textual formats, image formats, audio formats, video formats, or other formats. In some implementations, the information items may relate to press releases, articles, bills, laws, or other types of government information. In some implementations, information data may indicate an association between an information item and one of a plurality of predefined entities. For example, mentioning the name of the predefined entity, or any alias associated with the predefined entity, in the information item may indicate an association. An entity mention may be in any text, audio, video, or any other format or medium interpretable by digital processes or understandable by humans.

Suggestion module 110 may be configured to determine suggested ones of the predefined sources, suggested ones of information items of the predefined sources, one or more suggested keywords, or other suggestions based on the received input. Suggested sources, information items, or keywords may facilitate the discovery of search queries and enhance searching capabilities. In addition, suggestion module 110 may provide suggestions to sources containing information items associate with one or more predefined entities.

User interface module 112 may be configured to provide a set of suggestions including a group of suggestions relating to the suggested sources, a group of suggestions relating to the suggested information items, a group of suggestions relating to the suggested keywords, or a group of other suggestions for presentation on a user interface.

Figure 2:
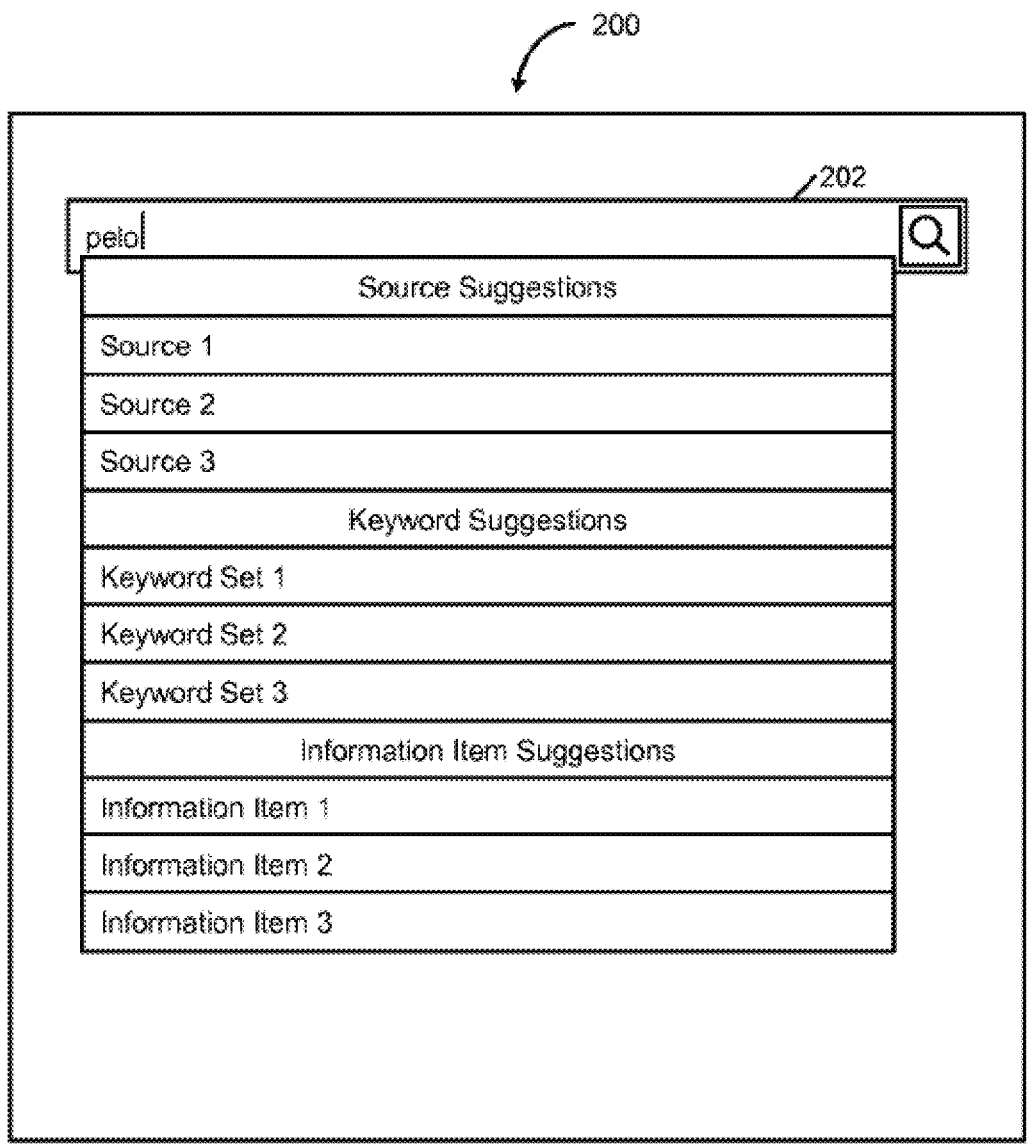
FIG. 2 illustrates an exemplary diagram of a display of a user interface that presents a query input component, selectable entity mention filters, and selectable search tools and information items relating to received input entered via the query input component, in accordance with one or more implementations.

For example, FIG. 2 illustrates an exemplary diagram of a display 200 of a user interface that presents a query input component 202 and suggestions relating to received input entered via query input component 202, in accordance with one or more implementations. As shown by FIG. 2, "pelo" may be a portion of a query that has been entered via query input component 202. Responsive to the portion of the query being entered, source suggestions, keyword suggestions, and information item suggestions that relate to the portion of the query or a predicted query of the query portion (e.g., "pelosi," "pelosi remarks," etc.) may be presented on display 200 simultaneously with query input component 202.

In one use case, the source suggestions (e.g., Source 1, Source 2, Source 3, etc.) may identify sources with source names that include terms or phrases relating to the portion of the query or the predicted query, sources that include information items that indicate terms or phrases relating to the portion of the query or the predicted query, or other related sources. The source suggestions may, for example, be determined based on frequency that the information items of the respective sources indicate the related terms or phrases (e.g., selecting source suggestions from sources with the greatest amounts of information items that indicate the related terms or phrases are selected as source suggestions, sources with the greatest average frequencies of the related terms or phrases in their respective information items, etc.). The order of the source suggestions in the depicted list may be based on frequency that the information items of the respective sources indicate the related terms or phrases (e.g., suggested sources associated with greater frequencies are placed higher on the list, suggested sources associated with lower frequencies are placed lower on the list, etc.).

In another use case, the keyword suggestions (e.g., Keyword Set 1, Keyword Set 2, Keyword Set 3, etc.) may identify predicted keywords or other related keywords. The keyword suggestions or the order of the keyword suggestions may, for example, be based on frequency information relating to the suggested keywords. In yet another use case, the information item suggestions may identify information items of the predefined sources that indicates terms or phrases relating to the portion of the query or the predicted query, or other related information items. The information item suggestions or the order of the information item suggestions may, for example, be based on frequency information relating to the suggested information items.

In various implementations, suggestion module 110 may be configured to determine the suggested sources based on a determination that one or more identifiers of the suggested sources correspond to the received input. With respect to FIG. 2, for example, the source suggestions may include "Rep. Pelosi, Nancy—(D—CA)," "Office of the Democratic Leader—Nancy Pelosi," etc. In some implementations, suggestion module 110 may be configured to determine the suggested sources based on a determination that information items of the suggested sources correspond to the received input.

In certain implementations, user interface module 112 may be configured to provide a query input component on a display of the user interface. The query input component may, for example, be configured to receive input. In some implementations, query input module 108 may be configured to receive a second input relating to the query responsive to providing the set of suggestions (that includes a group of suggestions relating to the suggested sources, a group of suggestions relating to the suggested information items, a group of suggestions relating to the suggested keywords, or a group of other suggestions).

Information retrieval module 114 may be configured to determine a subset of information items that relate to the received input. Information retrieval module 114 may be configured to determine one or more sources associated with the determined subset of the information items. User interface module 112 may provide one or more representations of the determined subset of the information items and one or more representations of corresponding determined sources on the display of the user interface simultaneously with the query input component and the entity mention filter area. In some implementations, user interface module 112 may be configured to provide an entity mention filter area 316 on the display 300 of the user interface. The entity mention filter area 316 may contain one or more options to select filters relating to one or more predefined entities, where the entities are visually organized by entity type. User interface module 112 may be configured to receive user input corresponding to a selection and application of one or more entity mention filters.

Figure 3:
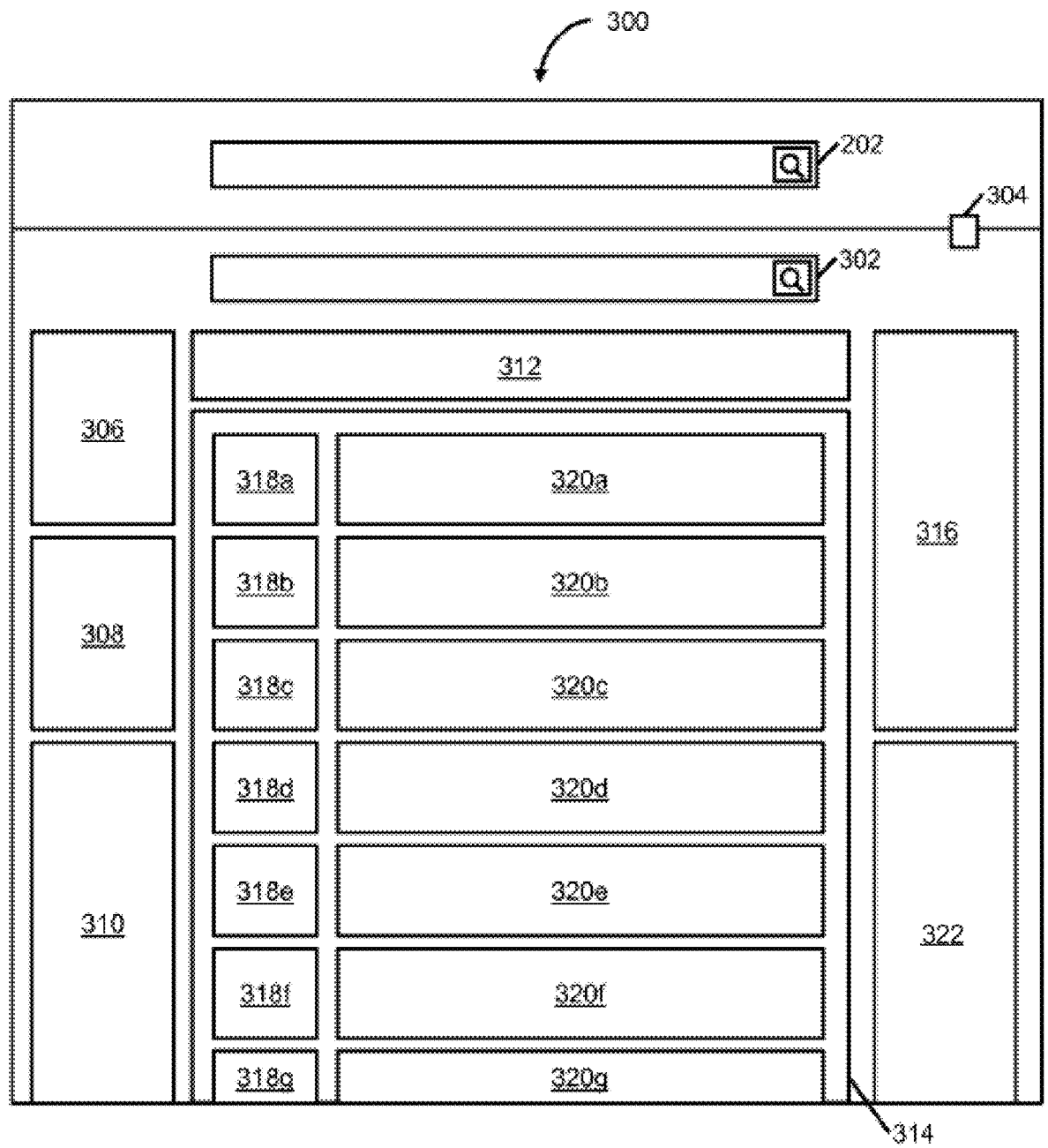
FIG. 3 illustrates an exemplary diagram of a display of a user interface, in accordance with one or more implementations.

For example, FIG. 3 illustrates an exemplary diagram of a display 300 of a user interface, in accordance with one or more implementations. As shown by FIG. 3, display 300 may include query input components 202 and 302. In one use case, query input component 202 may be configured to receive input for a new search query. Query input component 302 may be configured to receive input to search within a current set of search results. Representation 304 may be a representation of an option to save the current set of search results, save a query input corresponding to the current set of search results, or save other information. The saved information may, for example, be stored in a user profile of a user.

As depicted by FIG. 3, for example, display 300 may include feed area 306, search tool area 312, a primary information item area 314, a secondary information area 322, and an entity mention filter area 316. Primary information item area 314 may include one or more source representation areas 318 and corresponding information item description areas 320. In one embodiment, responsive to selection of a suggested keyword via a drop-drop menu of suggestions that is presented based on a first input entered into query input component 202, information items that relate to the suggested keyword may be determined along with one or more sources that are associated with the determined information items. Representations of the determined sources and representations of the determined information items may be presented on primary information item area 314 (e.g., source representation areas 318, information item description areas 320, etc.) and secondary information item area 322. Representations of entities organized by entity type, along with options to select one or more entity mention filters may be provided by user interface module 112 in entity mention filter area 316. In certain implementations, information retrieval module 114 may be configured to determine a subset of information relating to input received by query input module 108.

Figure 4:
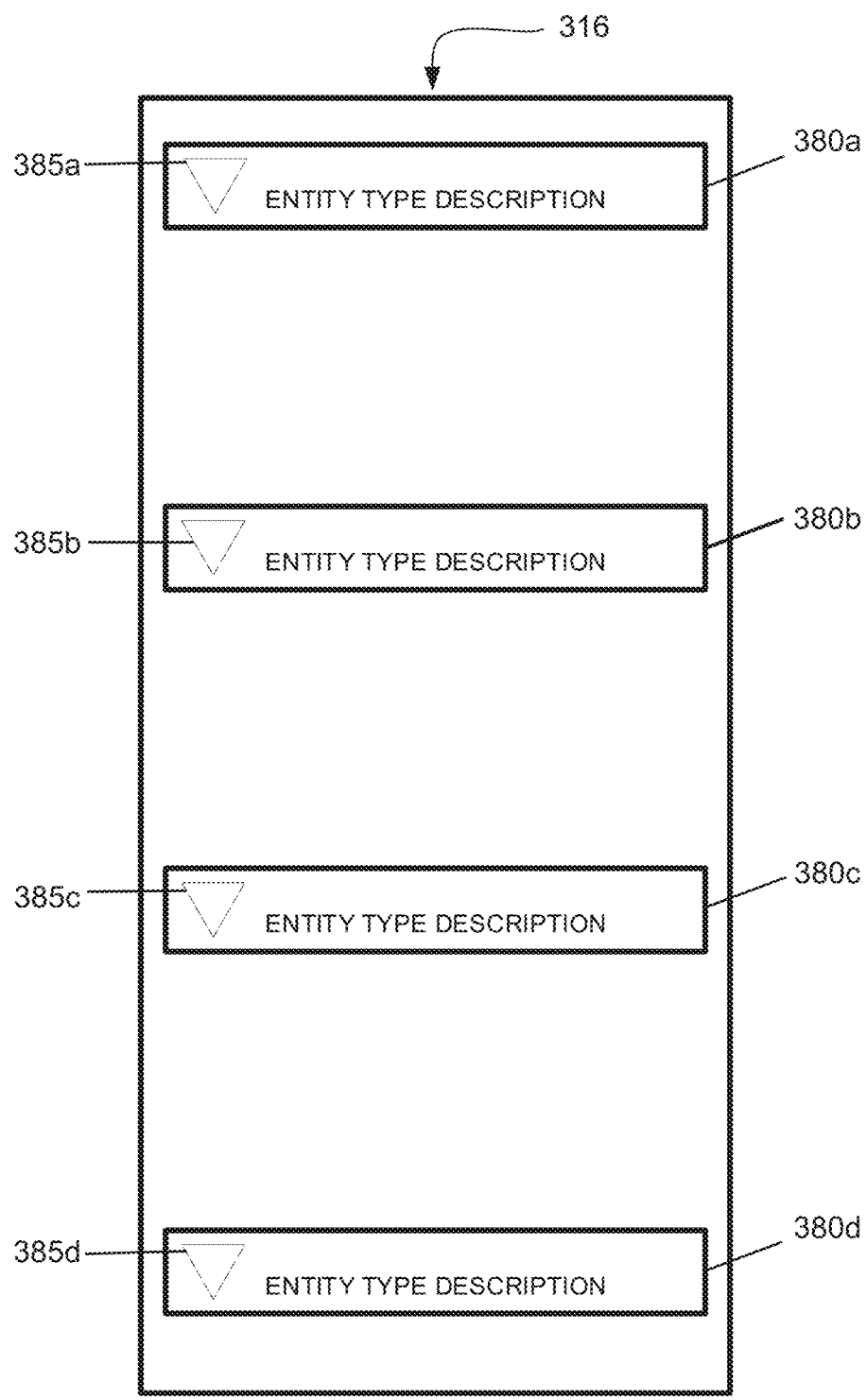
FIG. 4 illustrates an exemplary entity mention filter area illustrating selectable entity types.

In some implementations, referring to FIG. 4, user interface module 112 may be configured to provide one or more representations of options to select or unselect one or more of a plurality of predefined entity types 380 in the entity mention filter area 316 on display 300 of the user interface simultaneously with the query input component 202, the representations of the determined sources, the primary area 314, and the secondary area 316. user interface module 112 may be configured to provide one or more representations of descriptions of the one or more entity types.

In one or more implementations, predefined entities associated with the plurality of predefined entity types 380 may hidden, collapsed, or otherwise removed from view on display 300 while the predefined entity types 380 remain unselected. In some implementations, user interface module 112 may provide one or more representation 385 in entity mention filter area 316 indicating whether an entity type 380 has been selected. For example, a FIG. 4 the default representations 385 may indicate that the entity types 380 have not been selected.

Figure 5:
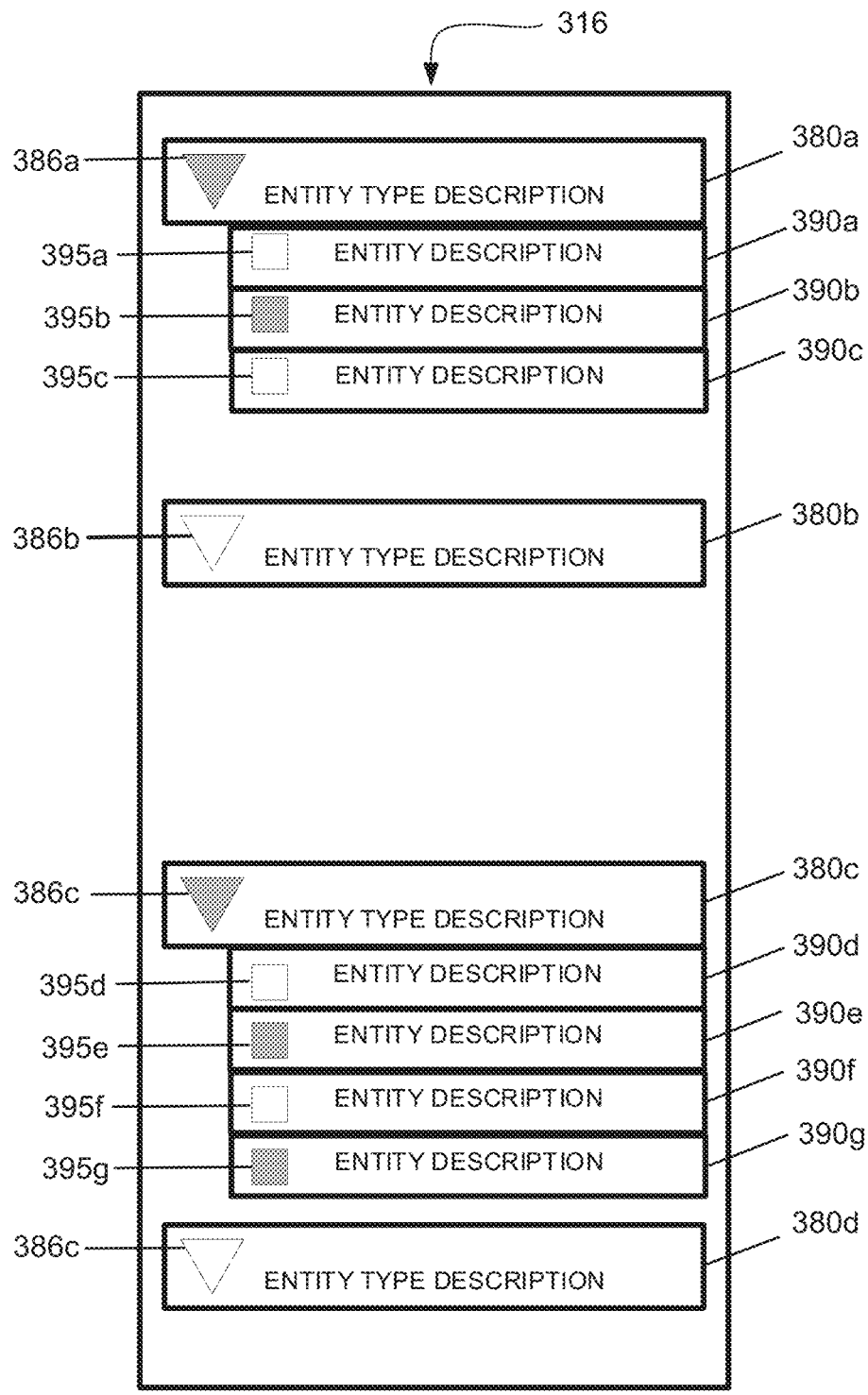
FIG. 5 illustrates an exemplary entity mention filter area illustrating selectable predefined entities and filters.

In some implementations, and referring to FIG. 5, the predefined entities 390 associated with the plurality of predefined entity types 380 may be represented by user interface module 112 in entity mention area 316 on display 300 when one or more of the plurality of predefined entity types 380 remain selected. For example, alternate representations 386a and 386c may indicate that the entity types 380a and 380c, respectively, have been selected.

Entity mention filter area 316 may include selectable predefined entities 390. In some embodiments, responsive to an entity type 380 being a selected, representations of predefined entities 390 associated with the entity types may be provided in entity mention filter area 316. For example, responsive to entity type 380c being selected, representations of predefined entities 390d-g associated with entity type 380c may be provided in entity mention filter area 316. Multiple predefined entities associated with different entity types may be provided simultaneously. For example, the predefined entities associated with both entity types 380a and 380c are provided.

User interface module 112 may receive user input of a selection of one or more of the predefined entities. User input may be received through any form of computational input, include input in the form of a mouse click, voice command, gesture, or touch screen input. User interface module 112 may provide a graphical representation 385 indicating whether one or more of the plurality of predefined entity types has been selected. For example, the graphical representations 395b, 395e, and 395g indicate that predefined entities 390b, 390e, and 395g have been selected by a user.

The selection of one or more of the predefined entities may correspond to the application of an entity mention filter by entity mention filter module 120. That is, by selecting one or more of the predefined entities 390, the user may cause to initiate, or prepare to initiate, an application of one or more entity mention filters by entity mention filter module 120 corresponding to the one or more selected predefined entities 390. As discussed herein, user interface module 112 may be configured to provide one or more representations of information items in a first area on the display of the user interface. Likewise, user interface module 112 may be configured to provide one or more representations of information items determined by entity mention filter module 120 through application of one or more of the entity mention filters.

In one use case, referring to FIG. 5, predefined entity 390b may be selected as a first entity mention filter, and predefined entities 390e and 390g may be selected as second entity mention filters. As such, for instance, information items of the determined subset that relate to entities described by the entity mention filters 390b, 390e, and 390g may be determined by entity mention filter module 120 and represented by user interface module 112 in display 300. In this way, among other benefits, system 100 may enable users to locate and visualize information items and their corresponding information sources that are associated with predefined entities.

The entity mention filter module 120 may determine a set of information items based on an application of an entity mention filter. In various implementations, an entity mention filter may determine a set of information items having an association with a predefined entity and one or more predefined entity aliases. Entity mention filters may enable refinement of the sources and information items that are represented in primary information item area 314 or secondary information item area 322. In some embodiments, an entity mention filter may be applied on the determined subset of information items by entity mention filter module 120 after being selected in entity mention filter area 316 on a display 300 of a user interface.

In various implementations, entity mention filter module 120 may retrieve one or more information items that mention, contain, relate to, describe, or reference one or more predefined entities aliases corresponding to one or more of the predetermined entities 390. Entity mention filters may relate to one or more predefined aliases relating to one or more of the predefined entities. For example, in the case of corporate entities, the entity "The Coca Cola Company" may have one or more predefined aliases, including "Coca Cola" or "Coke." Predefined aliases may include abbreviations and nicknames. For example, the "NAACP" or "N.A.A.C.P" may be stored as an entity alias corresponding to the predefined entity, the "National Association for the Advancement of Colored People." Further, predefined aliases may preserve any stylization, character, or capitalization uniqueness of a known entity to ensure that entity mention filter module may capture all relevant information relating to entity mention filters selected by a user. For example, "D.A.R.E" may be a predefined aliases relating to the predefined entity "DARE" This provides advantages when the capitalization or punctuation is relevant to the known name of a predefined entity. Any abbreviation, term, or phrase containing text information serving to facilitate an entity mention filter relating to a predefined entity may serve as a predefined entity alias. In other embodiments, the entity mention filter module 120 may consider the context or circumstances of the apparent presence of a predefined entity aliases contained in an information item. For example, the a search for entities containing commonly used words may return search results not relevant to a user's desired search. In various embodiments, the entity mention filter module 120 may require a threshold number of mentions of one or more predefined aliases before indicating an association.

In certain implementations, indexing module 116 may be configured to store metadata in association with the predefined sources or the information items of the predefined sources. The metadata may indicate various attributes relating the predefined sources or the information items. In some implementations, the metadata may indicate an association between an information item and one or more predefined entity types 380, corresponding predefined entities 390, and corresponding predefined entity aliases. Thus, in some embodiments, determining an association between information items and predefined entities may comprise analyzing the information item metadata.

In certain implementations, search tool module 118 may be configured to define a source set associated with a search tool. The source set may, for instance, include at least one source associated with a search strategy. User interface module 112 may be configured to provide one or more representations to modify a search tool on the display of the user interface simultaneously with the query input component, the representations of the information items (e.g., the subset of the information items that relate to the received input), and the representations of sources (e.g., the sources of the predefined sources that relate to the determined subset of the information items). User interface module 112 may be configured to provide one or more representations of information items that are determined by search tool module 118 to be related to a selected search tool.

Figure 6:
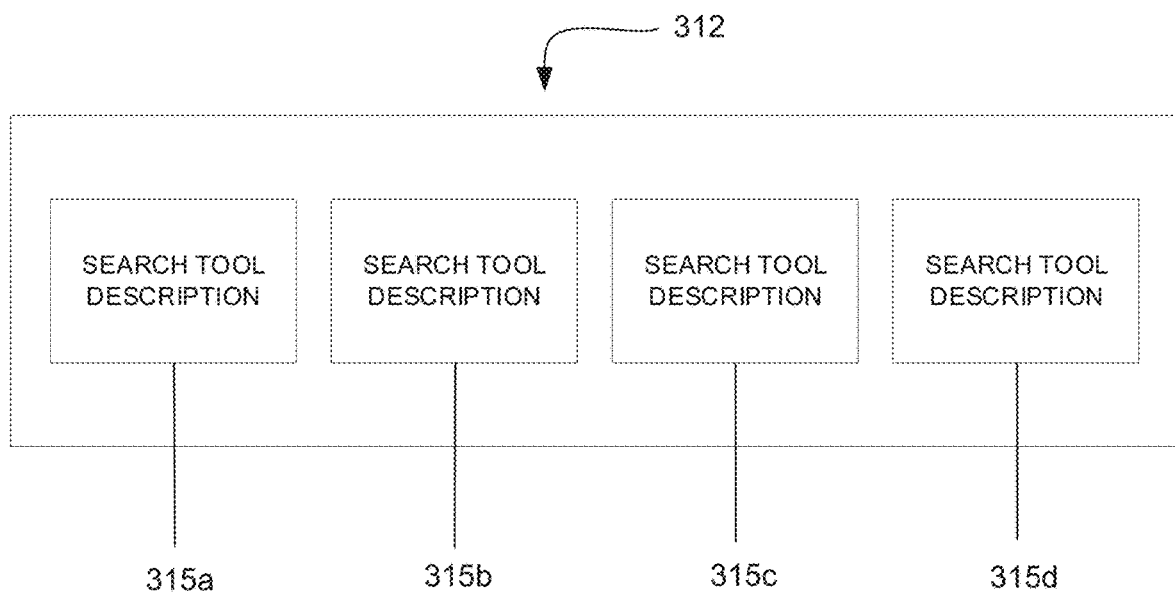
FIG. 6 illustrates an exemplary search tool area illustrating selectable search tools.

In various implementations, search tool module 118 may be configured to define a source set associated with one or more search tools. A search tool source set may, for example, include one or more predefined sources associated with a search tool. A search tool may organize information items based on a substantive, source-based component consistent with a source-targeted search strategy. For example, referring to FIG. 6, a "Due Diligence" search tool may be provided in search tool area 312 by the user interface module 112 in the search tool area 312 as search tool 315a, where the "Due Diligence" search tool source set may be coextensive with the predefined sources that relate to the determined subset of the information items. In this fashion, a user selecting the "Due Diligence" search tool will obtain a comprehensive and thorough set of information items. Alternatively, a "Law Making" search tool may be provided by the user interface module 112 in the search tool area 312 as search tool 315b, where the "Law Making" search tool may be limited to sources relating to legislation or bills introduced to a legislative body. In this way, a user selecting the "Law Making" search tool may obtain more narrowly tailored results corresponding to a particular research strategy. Other search tools may include "due diligence, "law making," "rule making," "compliance," and "trending." A "rule making" search tool may comprise sources relating to various judicial bodies. A "compliance" search tool may comprise sources relating to various regulatory bodies. A "trending" search tool may comprise sources having relatively more recent activity. In some implementations, a "trending" search tool may comprise sources that have posted, published, or otherwise communicated information items more frequently in a recent given period of time than in an earlier period of time.

Figure 8:
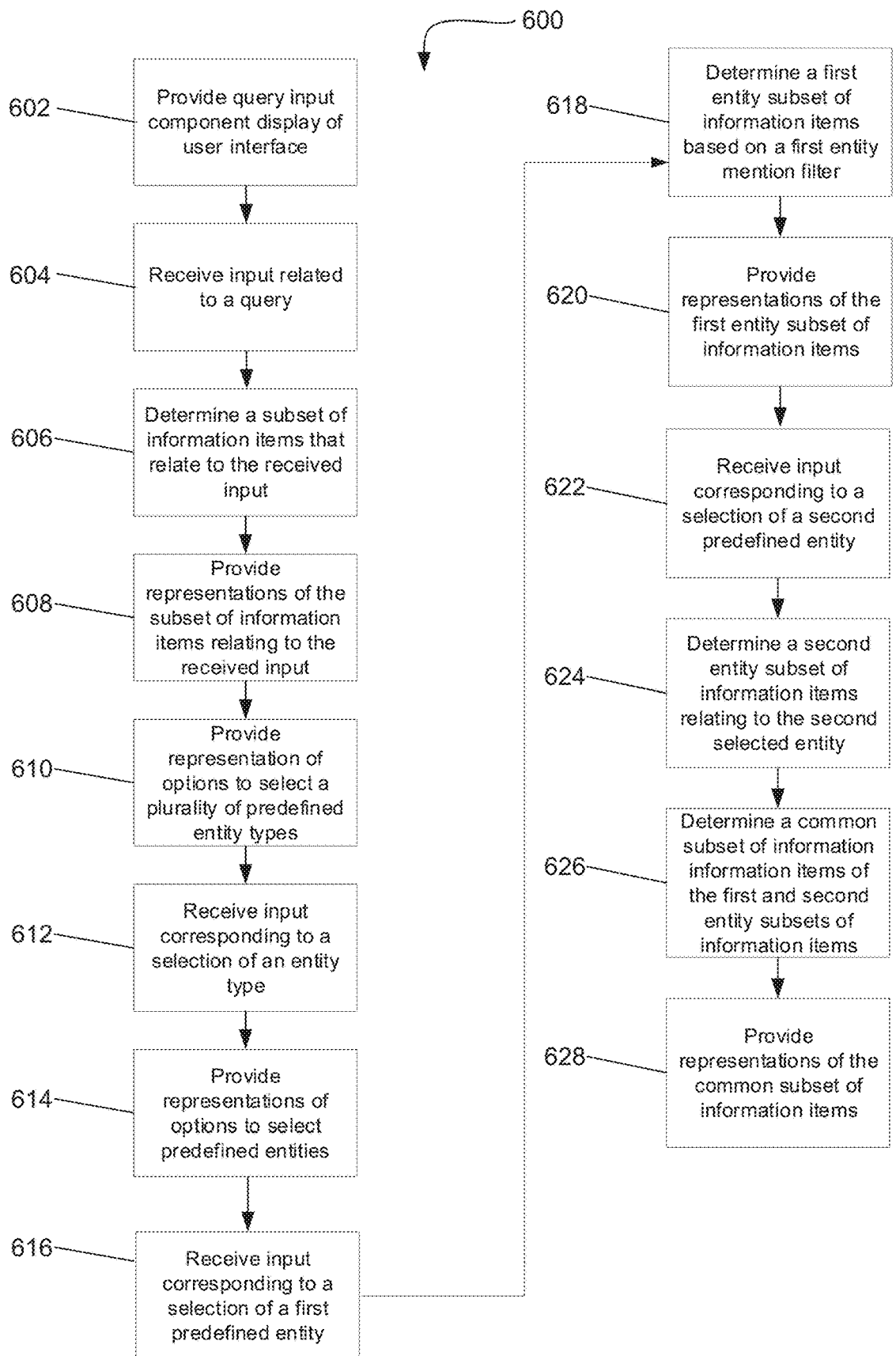
FIG. 8 illustrates a flowchart of processing operations for facilitating queries of a topic-based-source-specific search system using entity mention filters, in accordance with one or more implementations.

User interface module 112 may be configured to provide one or more representations of options to select a search tool in search tool area 312 on the display of the user interface simultaneously with the query input component, the representations of the determined subset of the information items, and the representations of the determined sources (e.g., the sources of the predefined sources associated with the search tools that relate to the determined subset of the information items). Referring to FIG. 8, the search tool area 312 may comprise representations of options to select one or more search tool 315a-d. The search tool area 312 may comprise representations of descriptions of the one or more search tool 315a-d. The search tool may be predefined and associated with one or more predefined source sets corresponding to a search tool.

In various implementations, the search tool module 118 may determine one or more information items that are associated with the a search tool selected by a user through the user interface module 112. In some implementations, an information item may be associated with a particular search strategy if its corresponds to a source contained within the search tool source set. Thus, the search tool module 118 filters out information items corresponding to sources that are not contained with a selected search tool source set. User interface module 112 may be configured to provide one or more representations of information items that relate to a selected search tool.

In certain implementations, indexing module 116 may be configured to store metadata in association with the predefined sources or the information items of the predefined sources. The metadata may indicate various attributes relating the predefined sources or the information items. In some implementations, the metadata may indicate an association between an information item and one or more predefined search tool 315 and corresponding search tool source sets. Thus, in some embodiments, determining an association between information items and a search tool may comprise analyzing the information item metadata.

Figure 7:
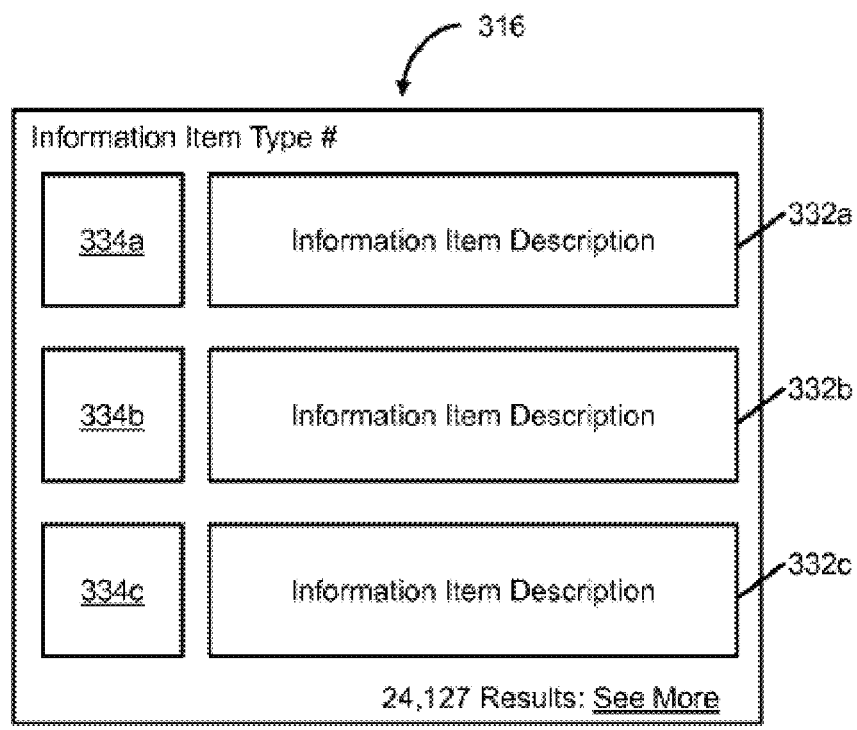
FIG. 7 illustrates exemplary diagrams of components relating to information items and sources on a display of a user interface, in accordance with one or more implementations.

With respect to FIG. 7 individual ones of the information items related to input received by query input module 108 may be represented by item description areas 320 in primary information item area 314 alongside a corresponding source representation area 318 (e.g., that includes a graphical representation of the source), and individual ones of the information items associated with the second item types may be represented by item description areas 332 in secondary information item area 322 alongside a corresponding source representation area 334 (e.g., that includes a graphical representation of the source). Individual ones of the item description areas 320 in primary information item area 314 may include more area for details (e.g., title of an information item, type of an information item, number of words in an information item, length or duration of an information item, date of an information item, etc.) relating to the corresponding information item than individual ones of the item description areas 332 in secondary information item area 322.

In various implementations, query input module 108 may receive a second input relating to the query responsive to the set of suggestions (that include a group of suggestions relating to the suggested sources, a group of suggestions relating to the suggested information items, a group of suggestions relating to the suggested keywords, or a group of other suggestions) provided by user interface module 112. In one use case, the received second input may correspond to a selection of at least one of the provided suggestions.

User device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

In some implementations, server 102 may include an electronic storage 122, one or more processors 124, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 124, information received from server 102, information received from user devices 104, and/or other information that enables server 102 to function as described herein. In some implementations, electronic storage may comprise a non-transitory, tangible computer-readable storage medium with an executable program stored thereon, wherein the program instructs a microprocessor to perform some or all of the functionality of modules 106, 108, 110, 112, 114, 116, 118, 120, and/or other modules.

Processor 124 is configured to provide information processing capabilities in server 102. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. Processor 124 may be configured to execute modules 106, 108, 110, 112, 114, 116, 118, 120, and/or other modules. Processor 124 may be configured to execute modules 106, 108, 110, 112, 114, 116, 118, 120, and/or other modules by software; hardware; firmware; some combination of software, hardware, and/or firmware; and/or other mechanisms for configuring processing capabilities on processor 124.

It should be appreciated that although modules 106, 108, 110, 112, 114, 116, 118 and 120 are illustrated in FIG. 1 as being co-located within a single processing unit, in implementations in which processor 124 includes multiple processing units, one or more of modules 106, 108, 110, 112, 114, 116, 118, and/or 120 may be located remotely from the other modules. The description of the functionality provided by the different modules 106, 108, 110, 112, 114, 116, 118, and/or 120 described below is for illustrative purposes, and is not intended to be limiting, as any of modules 106, 108, 110, 112, 114, 116, 118, and/or 120 may provide more or less functionality than is described. For example, one or more of modules 106, 108, 110, 112, 114, 116, 118, and/or 120 may be eliminated, and some or all of its functionality may be provided by other ones of modules 106, 108, 110, 112, 114, 116, 118, and/or 120. As another example, processor 124 may be configured to execute one or more additional modules that may perform some or all of the functionality attributed below to one of modules 106, 108, 110, 112, 114, 116, 118, and/or 120.

FIG. 8 illustrates a flowchart of processing operations for facilitating queries of a topic-based-source-specific search system using entity mention filters, in accordance with one or more implementations. The operations of process 600 presented below are intended to be illustrative. In some implementations, process 600 may be accomplished with one or more additional operations not described, and/or without one or more of the operations discussed. Additionally, the order in which the operations of process 600 are illustrated in FIG. 8 and described below is not intended to be limiting.

In certain implementations, one or more operations of process 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 600 in response to instructions stored electronically on an electronic storage medium. The one or more processing devices may include one or more devices configured through hardware, firmware, and/or software to be specifically designed for execution of one or more of the operations of process 600.

In certain implementations, the topic-based-source-system may be configured to collect information from pre-defined sources relating to a content topic and mentioning one or more predefined entities having a predefined entity type prior to queries of the topic-based-source-system. In some implementations, the content topic may correspond to government information or other type of information. In some embodiments, the predefined entity types may include, but are not limited to, accounting firms, associations, corporations, government offices, law firms, on-profit organizations, think tank, or unions.

In an operation 602, a query input component may be provided on a display 300 of a user interface. The query input component may be configured to receive input. Operation 602 may be performed by a user interface module that is the same as or similar to user interface module 112, in accordance with one or more implementations.

In an operation 604, an input relating to a query may be received. Operation 604 may be performed by a query input module that is the same as or similar to query input module 108, in accordance with one or more implementations.

In an operation 606, a subset of information items of the predefined sources may be determined based on the received input. In certain implementations, the information items may relate to one or more of press releases, speeches, opinions, statements, legislation, or other government information. In some implementations, the information items may relate to bills or laws. Operation 606 may be performed by an information retrieval module 112, in accordance with one or more implementations. One or more sources associated with the determined subset of the information items may be determined by an information retrieval module, in accordance with one or more implementations. The determined sources may include one or more political or government sources. The political or government sources may relate to one or more political parties, political or government organizations, political or government figures, or other political or government sources.

In an operation 608, representations of one or more of the determined subset of information items may be provided on a display 300 of a user interface. The representation of the subset of information items may be provided in a primary area 314 of a display 300. Operation 608 may be performed by a user interface module that is the same as or similar to user interface module 112, in accordance with one or more implementations. In certain implementations, one or more representations of the determined subset of information items and one or more representations of the determined sources may be provided on the display 300 of the user interface simultaneously with the query input component. Providing of the representations of the determined subset and the representations of the determined sources may be performed by a user interface module that is the same as or similar to user interface module 112, in accordance with one or more implementations.

In an operation 610, a representation of options to select a plurality of predefined entity types may be provided by on a display 300 of a user interface. The representation of options to select the plurality of predefined entity types may be provided in an entity mention filter area 316 simultaneously with the primary area 314. The predefined entity types may be one or more of an accounting firm, an association, a corporation, a government office, a law firm, a non-profit organization, a think tank, or a union. Operation 610 may be performed by a user interface module that is the same as or similar to the user interface module 112.

In an operation 612, input may be received corresponding to the a user selection of one or more of the plurality of predefined entity types. In some implementations, user interface module 112 may provide a graphical representation indicating whether one or more of the plurality of predefined entity types have been selected. Operation 612 may be performed by a user interface module that is the same as or similar to user interface module 112, in accordance with one or more implementations.

In an operation 614, a representation of options to select one or more predefined entities corresponding to one or more selected predefined entity types may be provided on a display 300 of a user interface. In some implementations, user interface module 112 may provide a graphical representation indicating whether one or more of the predefined entities have been selected. In some implementation, the representations of options to select one or more predefined entities may be displayed underneath the representation of the one or more predefined entity types corresponding to the one or more predefined entities. Operation 620 may be performed by a user interface module that is the same as or similar to user interface module 112, in accordance with one or more implementations.

In an operation 616, input may be received corresponding to a first user selection of a predefined entity corresponding to one of the one or more selected predefined entity types. In some implementations, user interface module 112 may provide a graphical representation indicating whether one or more of the predefined entities have been selected. In other implementations, multiple inputs may be received corresponding to the user selection of one or more predefined entities. Operation 616 may be performed by a user interface module that is the same as or similar to user interface module 112, in accordance with one or more implementations.

In an operation 618, a first entity subset of one or more information items of the determined subset of information items may be determined based on a first entity mention filter. In implementations, the first entity mention filter may correspond to a user-selected predefined entity. In various embodiments, the first entity mention filter may retrieve a first entity subset of one or more information items that mention, contain, relate to, describe, or reference the first selected predefined entity or one or more predefined aliases associated with a the first predefined entity. Operation 618 may be performed by an entity mention filter module that is the same as or similar to entity mention filter module 120, in accordance with one or more implementations.

In an operation 620, one or more representations of the first entity subset of one or more information items may be provided in a primary area 314 on a display 300 of a user interface. Operation 620 may be performed by a user interface module that is the same as or similar to user interface module 112, in accordance with one or more implementations.

In an operation 622, input may be received corresponding to a second user selection of a predefined entity corresponding to one of the one or more selected predefined entity types. In some implementations, user interface module 112 may provide a graphical representation indicating whether one or more of the predefined entities have been selected. In other implementations, multiple inputs may be received corresponding to the user selection of one or more predefined entities. Operation 622 may be performed by a user interface module that is the same as or similar to user interface module 112, in accordance with one or more implementations.

In an operation 624, a second entity subset of one or more information items of the determined subset of information items may be determined based on a second entity mention filter. In implementations, the second entity mention filter may correspond to the second user-selected predefined entity. In various embodiments, the second entity mention filter may retrieve a second entity subset of one or more information items that mention, contain, relate to, describe, or reference the second selected predefined entity or one or more predefined aliases associated with the second selected predefined entity. Operation 624 may be performed by an entity mention filter module that is the same as or similar to entity mention filter module 120, in accordance with one or more implementations.

In an operation 626, a common subset of one or more information items of the determined first and second entity subsets of information items may be determined. In implementations, the common subset of information items may comprise one or more information items retrieved by an entity mention filter module 120 through application of a first and second entity mention filter. Operation 626 may be performed by an entity mention filter module that is the same as or similar to entity mention filter module 120, in accordance with one or more implementations.

In an operation 628, one or more representations of the common subset of one or more information items may be provided in a primary area 314 on a display 300 of a user interface. Operation 620 may be performed by a user interface module that is the same as or similar to user interface module 112, in accordance with one or more implementations.

Figure 9:
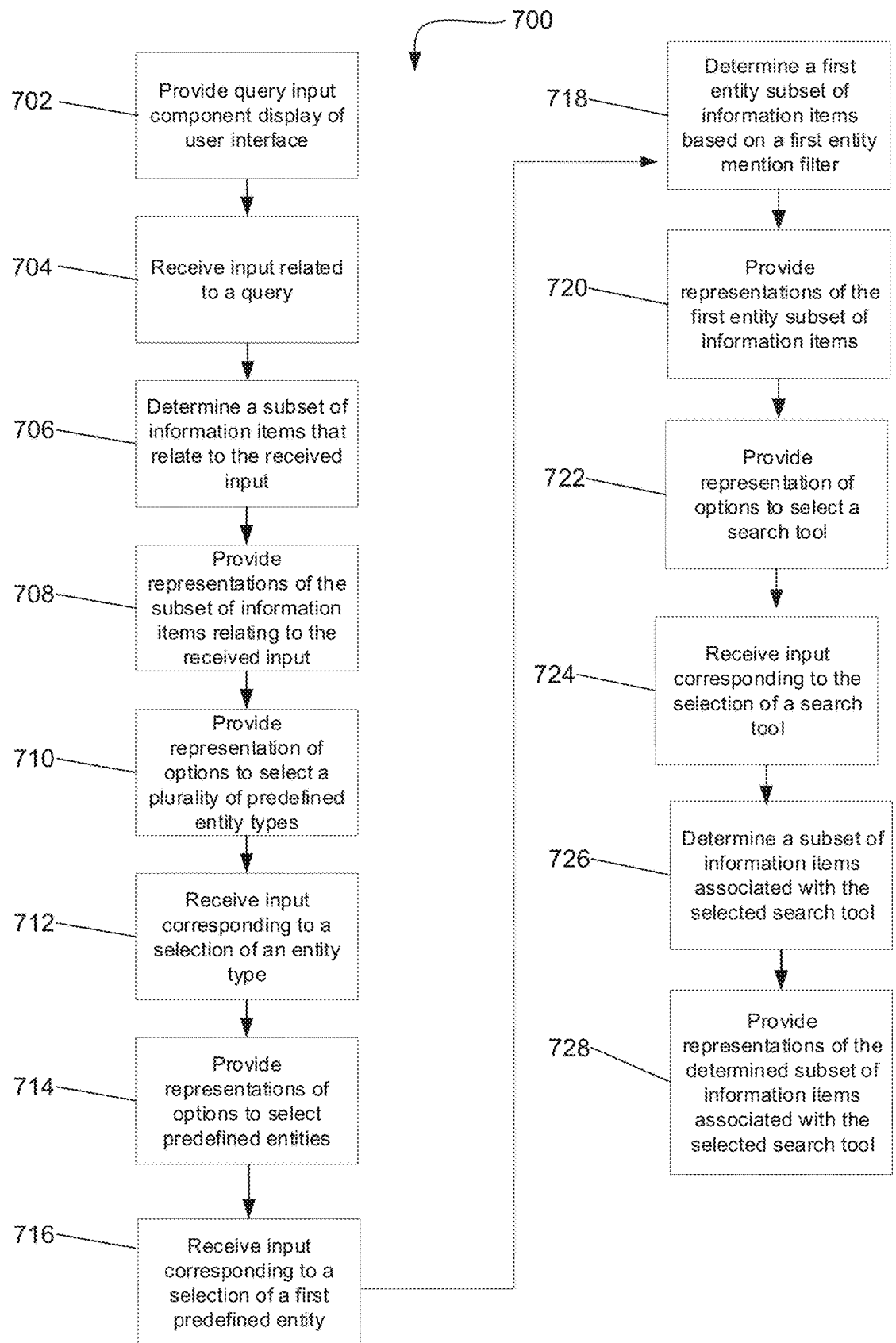
FIG. 9 illustrates a flowchart of processing operations for facilitating queries of a topic-based-source-specific search system using entity mention filters and search tools, in accordance with one or more implementations.

FIG. 9 illustrates a flowchart of processing operations for facilitating queries of a topic-based-source-specific search system using entity mention filters and search tools, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 9 and described below is not intended to be limiting.

In certain implementations, one or more operations of process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

In certain implementations, the topic-based-source-system may be configured to collect information from predefined sources relating to a content topic prior to queries of the topic-based-source-system. In some implementations, the content topic may correspond to government information or other type of information. In certain implementations, the topic-based-source-system may be configured to associate one or more sources to one or more of a plurality of search tools. In certain implementations, the topic-based-source-system may be configured to present only information items corresponding to a user-selected search tool.

In an operation 702, a query input component may be provided on a display 300 of a user interface. The query input component may be configured to receive input. Operation 702 may be performed by a user interface module that is the same as or similar to user interface module 112, in accordance with one or more implementations.

In an operation 704, an input relating to a query may be received. Operation 704 may be performed by a query input module that is the same as or similar to query input module 108, in accordance with one or more implementations.

In an operation 706, a subset of information items of the predefined sources may be determined based on the received input. In certain implementations, the information items may relate to one or more of press releases, speeches, opinions, statements, legislation, or other government information. In some implementations, the information items may relate to bills or laws. Operation 706 may be performed by an information retrieval module 112, in accordance with one or more implementations. One or more sources associated with the determined subset of the information items may be determined by an information retrieval module, in accordance with one or more implementations. The determined sources may include one or more political or government sources. The political or government sources may relate to one or more political parties, political or government organizations, political or government figures, or other political or government sources.

In an operation 708, representations of one or more of the determined subset of information items may be provided on a display 300 of a user interface. The representation of the subset of information items may be provided in a primary area 314 of a display 300. Operation 708 may be performed by a user interface module that is the same as or similar to user interface module 112, in accordance with one or more implementations. In certain implementations, one or more representations of the determined subset of information items and one or more representations of the determined sources may be provided on the display 300 of the user interface simultaneously with the query input component.

Providing of the representations of the determined subset and the representations of the determined sources may be performed by a user interface module that is the same as or similar to user interface module 112, in accordance with one or more implementations.

In an operation 710, a representation of options to select a plurality of predefined entity types may be provided by on a display 300 of a user interface. The representation of options to select the plurality of predefined entity types may be provided in an entity mention filter area 316 simultaneously with the primary area 314. The predefined entity types may be one or more of an accounting firm, an association, a corporation, a government office, a law firm, a non-profit organization, a think tank, or a union. Operation 710 may be performed by a user interface module that is the same as or similar to the user interface module 112.

In an operation 712, input may be received corresponding to the a user selection of one or more of the plurality of predefined entity types. In some implementations, user interface module 112 may provide a graphical representation indicating whether one or more of the plurality of predefined entity types have been selected. Operation 712 may be performed by a user interface module that is the same as or similar to user interface module 112, in accordance with one or more implementations.

In an operation 714, a representation of options to select one or more predefined entities corresponding to one or more selected predefined entity types may be provided on a display 300 of a user interface. In some implementations, user interface module 112 may provide a graphical representation indicating whether one or more of the predefined entities have been selected. In some implementation, the representations of options to select one or more predefined entities may be displayed underneath the representation of the one or more predefined entity types corresponding to the one or more predefined entities. Operation 720 may be performed by a user interface module that is the same as or similar to user interface module 112, in accordance with one or more implementations.

In an operation 716, input may be received corresponding to a first user selection of a predefined entity corresponding to one of the one or more selected predefined entity types. In some implementations, user interface module 112 may provide a graphical representation indicating whether one or more of the predefined entities have been selected. In other implementations, multiple inputs may be received corresponding to the user selection of one or more predefined entities. Operation 716 may be performed by a user interface module that is the same as or similar to user interface module 112, in accordance with one or more implementations.

In an operation 718, a first entity subset of one or more information items of the determined subset of information items may be determined based on a first entity mention filter. In implementations, the first entity mention filter may correspond to a user-selected predefined entity. In various embodiments, the first entity mention filter may retrieve a first entity subset of one or more information items that mention, contain, relate to, describe, or reference the first selected predefined entity or one or more predefined aliases associated with a the first predefined entity. Operation 718 may be performed by an entity mention filter module that is the same as or similar to entity mention filter module 120, in accordance with one or more implementations.

In an operation 720, one or more representations of the first entity subset of one or more information items may be provided in a primary area 314 on a display 300 of a user interface. Operation 720 may be performed by a user interface module that is the same as or similar to user interface module 112, in accordance with one or more implementations.

In an operation 722, one or more representations of options to select a search tool may be provided in search tool area 312 on a display 300 of a user interface. In various implementations, a search tool may correspond to a search tool source set which relate to a particular search strategy. The one or more source sets may correspond to different types of information sources. The representations of search tools may include "due diligence, "law making," "rule making," "compliance," and "trending." The one or more representations of options to select a search tool may correspond to a predefined set of sources associated with the one or more representations of options to select a search tool. Operation 722 may be performed by a user interface module that is the same as or similar to user interface module 112, in accordance with one or more implementations.

In an operation 724, input may be received corresponding to a user selection of a search tool. Operation 724 may be performed by a user interface module that is the same as or similar to user interface module 112, in accordance with one or more implementations.

In an operation 726, a search tool subset of information items of the one or more determined first entity subset of information items that are associated with selected search tool source set may be determined. In some embodiments, the determined search tool subset of information items correspond to one or more sources associated with the selected search tool. Operation 726 may be performed by a search tool module that is the same as or similar to search tool module 118, in accordance with one or more implementations.

In an operation 728, one or more representations of the determined search tool subset of information items may be provided in primary area 314 on a display 300 of a user interface. Operation 728 may be performed by a user interface module that is the same as or similar to user interface module 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

The invention claimed is:

1. A computer-implemented method of facilitating queries of a topic-based-source-specific search system, the system being configured to collect information from predefined sources relating to a content topic prior to the queries, the method being implemented by the system that includes one or more processors executing one or more computer program modules which, when executed, perform the method, the method comprising:

providing, by a user interface module, a query input component on a display of a user interface, wherein the query input component is configured to receive input;

receiving, by a query input module, an input relating to a query;

determining, by an information retrieval module, a determined subset of information items that relate to the received input;

determining, by the information retrieval module, one or more sources associated with the determined subset of the information items;

providing, by the user interface module, one or more representations of the sources associated with the determined subset of the information items in a first area on the display of the user interface simultaneously with the query input component;

determining, by an entity mention filter module, one or more first entity information items of the determined subset of information items based on a first entity mention filter, wherein the first entity mention filter relates to a predefined first entity having a predefined entity type and one or more predefined first aliases associated with the first entity;

providing, by the user interface module, one or more representations of the first entity information items and one or more representations of the sources associated with the first information items in the first area on the display of the user interface, wherein the first area is provided on the display of the user interface simultaneously with the query input component;

determining, by the entity mention filter module, one or more second information items of the determined subset of information items based on a second entity mention filter, wherein the second entity mention filter relates to a predefined second entity having a predefined entity type and one or more predefined second aliases associated with the second entity;

determining, by the entity mention filter module, one or more common information items of the first information items and second information items;

providing, by the user interface module, one or more representations of the determined common information items and one or more representations of the sources associated with the common information items in the first area on the display of the user interface, wherein the first area is provided on the display of the user interface simultaneously with the query input component;

determining, by a search tool module, a search tool source set associated with a search tool, wherein the search tool source set includes at least one source associated with a search strategy;

providing, by the user interface module, one or more representations of options to select a search tool in a search tool area on the display of the user interface, wherein the search tool area is provided on the display of the user interface simultaneously with the first area and the query input component;

determining, by the search tool module, one or more of the common information items associated with the search tool source set; and providing, by the user interface module, one or more representations of the common information items associated with the search tool source set in the first area on the display of the user interface, wherein the first area is provided on the display of the user interface simultaneously with the query input component and the one or more representations of options to select a search tool.

2. The method of claim 1, wherein a predefined entity type is one or more of an accounting firm, an association, a corporation, a government office, a law firm, a non-profit organization, a think tank, or a union.

3. The method of claim 1, wherein a predefined entity type is one or more of an accounting firm, an association, a corporation, a government office, a law firm, a non-profit organization, a think tank, or a union.

4. The method of claim 1, wherein a search strategy is related to one or more of due diligence, lawmaking, rulemaking, compliance, and trending.

5. The method of claim 1, further comprising:
providing, by the user interface module, one or more representations of options to select or unselect one or more of a plurality of predefined entity types in a second area on the display of the user interface, wherein the second area is provided on the display of the user interface simultaneously with the first area and the query input component;

receiving, by the user interface module, user input corresponding to a selection of one or more of the plurality of predefined entity types;

providing, by the user interface module, one or more representations predefined entities corresponding to the one or more selected predefined entity types in a second area on the display of the user interface, wherein the one or more representations of the predefined entities are provided on the display of the user interface simultaneously with one or more representations of the plurality of predefined entity types; and providing, by the user interface module, one or more representations of options to select or unselect one or more of the predefined entities in the second area on the display of the user interface.

6. The method of claim 5, further comprising:
providing, by the user interface module, an alternative representation adjacent to one or more of the representations of the predefined entities in the second area on the display of the user interface if the entity mention filter module indicates that there are no information items associated with one or more of the predefined entities.

7. The method of claim 6, wherein the alternative representation comprises a shaded and closed object.

8. The method of claim 1, further comprising:
storing, by an indexing module, metadata in association with the information items, wherein the metadata indicate one or more of:
one or more predefined entities relating to the information items;
one or more predefined entity aliases relating to the information items; and
one or more sources relating to the information items.

9. The method of claim 8, wherein determining, by the entity mention filter module, the first entity information items comprises analyzing the metadata of one or more of the information objects of the determined subset of information objects.

10. The method of claim 1, further comprising:
storing, by an indexing module, metadata in association with the predefined sources or the determined subset of information items, wherein the metadata indicate one or more predefined entities relating to the predefined sources or the determined subset of information items, and one or more predefined entity aliases relating to the one or more predefined entities.

11. A computer-implemented method of facilitating queries of a topic-based-source-specific search system using entity mention filters, the system being configured to collect information from predefined sources relating to a content topic prior to the queries, the method being implemented by the system that includes one or more processors executing one or more computer program modules which, when executed, perform the method, the method comprising:

providing, by a user interface module, a query input component on a display of a user interface, wherein the query input component is configured to receive input;

receiving, by a query input module, an input relating to a query;

determining, by an information retrieval module, a determined subset of information items that relates to the received input;

determining, by the information retrieval module, one or more sources associated with the determined subset of the information items;

determining, by the information retrieval module, one or more predefined entities associated with the determined subset of information items;

providing, by the user interface module, one or more representations of the determined subset of information items and one or more representations of the sources associated with the determined subset of information items in a first area on the display of the user interface simultaneously with the query input component;

providing, by the user interface module, one or more representations of predefined entities corresponding to one or more predefined entity types in a second area on the display of the user interface, wherein the one or more representations of the predefined entities are provided on the display of the user interface simultaneously with the one or more representations of predefined entity types;

providing, by the user interface module, one or more representations of options to select or unselect one or more of the predefined entities in the second area on the display of the user interface;

receiving, by the user interface module, a user input corresponding to a selection of one or more of predefined entities;

determining, by an entity mention filter module, one or more selected entity information items of the determined subset of information items based on a selected entity mention filter, wherein the selected entity mention filter discovers information items relating to the one or more selected predefined entities and to one or more predefined aliases associated with one or more of the selected predefined entities;

providing, by the user interface module, one or more representations of options to select or unselect one or more of a plurality of predefined entity types in a second area on the display of the user interface, wherein the second area is provided on the display of the user interface simultaneously with the first area and the query input component;

receiving, by the user interface module, user input corresponding to a selection of one or more of the plurality of predefined entity types;

determining, by a search tool module, a search tool source set associated with a search tool, wherein the search tool source set includes at least one source associated with the search strategy;

providing, by the user interface module, one or more representations of options to select a search tool in a search tool area on the display of the user interface;

determining, by the search tool module, one or more selected entity information items of the determined subset of information items having an association with the search tool source set; and providing, by the user interface module, one or more representations of the selected entity information items associated with the search tool source set in a first area on the display of the user interface, wherein the first area is provided on the display of the user interface simultaneously with the query input component and the one or more representations of options to select a search tool.

12. The method of claim 11, wherein a predefined entity type is one or more of an accounting firm, an association, a corporation, a government office, a law firm, a non-profit organization, a think tank, or a union.

13. The method of claim 11, wherein a search strategy is related to one or more of due diligence, lawmaking, rulemaking, compliance, and trending.

14. The method of claim 11, further comprising:
storing, by an indexing module, metadata in association with the information items, wherein the metadata indicate one or more of:
one or more predefined entities relating to the information items;
one or more predefined entity aliases relating to the information items;
one or more sources relating to the information items; and
a search tool source set associated with the information items.

15. The method of claim 14, wherein determining, by the search tool module, one or more selected entity information items of the determined subset of information items having an association with the search tool source set comprises analyzing the metadata information of an information object.

* * * * *